United States Patent
Cadouri

(10) Patent No.: US 7,555,736 B2
(45) Date of Patent: Jun. 30, 2009

(54) METHOD AND SYSTEM FOR USING PATTERN MATCHING TO PROCESS AN INTEGRATED CIRCUIT DESIGN

(75) Inventor: Eitan Cadouri, Cupertino, CA (US)

(73) Assignee: Cadence Design Systems, Inc., San Jose, CA (US)

(*) Notice: Subject to any disclaimer, the term of this patent is extended or adjusted under 35 U.S.C. 154(b) by 386 days.

(21) Appl. No.: 11/453,720

(22) Filed: Jun. 14, 2006

(65) Prior Publication Data

US 2006/0281200 A1   Dec. 14, 2006

Related U.S. Application Data

(60) Provisional application No. 60/690,641, filed on Jun. 14, 2005.

(51) Int. Cl.
    *G06F 17/50*   (2006.01)

(52) U.S. Cl. .................................... 716/5; 716/19
(58) Field of Classification Search ............... 716/1, 716/4–5, 19–21; 430/5, 22, 30
See application file for complete search history.

(56) References Cited

U.S. PATENT DOCUMENTS

| 6,311,319 | B1 | 10/2001 | Tu et al. |
| 2005/0142449 | A1* | 6/2005 | Shi et al. ............ 430/5 |

OTHER PUBLICATIONS

International Search Report and Written Opinion dated May 8, 2008 for PCT/US06/23213.

* cited by examiner

*Primary Examiner*—Paul Dinh

(57) ABSTRACT

Disclosed is a method, system, and computer program product for processing design objects, such as vias, for an integrated circuit design. In one approach, pattern matching is employed to perform DRC/LVS for scattering bars and Vias. A library of via combinations can be used to insert scattering bars into design. This approach of using a library can be applied to other structures in design in addition to vias.

16 Claims, 13 Drawing Sheets

| LIBRARY 707 | |
|---|---|
| Recognized Pattern | Substitute Configuration Pattern |
|  |  |
|  |  |
|  |  |
|  |  |

METHOD AND SYSTEM FOR USING PATTERN MATCHING TO PROCESS AN INTEGRATED CIRCUIT DESIGN

CROSS-REFERENCE TO RELATED APPLICATIONS

The application claims the benefit of U.S. Provisional Application Ser. No. 60/690,641, filed on Jun. 14, 2005, which is hereby incorporated by reference in its entirety.

BACKGROUND AND SUMMARY

A semiconductor integrated circuit (IC) has a large number of electronic components, such as transistors, logic gates, diodes, wires, etc., that are fabricated by forming layers of different materials and of different geometric shapes on various regions of a silicon wafer. Cut layers for an integrated circuit design are the metal plugs that connect two metal routing layers. Cut shapes must be connected to metal above and below the cut on the IC. This sandwich of two metal pieces and the cut (metal connecting the two shapes) is commonly called a "via."

Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example.

An integrated circuit designer may uses a set of layout EDA application programs to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters.

Photolithography is a fabrication process by which patterns for various devices, such as integrated circuits, are generated on substrate wafers. This process generally starts with the design of an IC chip, including the various circuit elements, their electrical interconnects, and their physical layout across the chip. After an integrated circuit is designed, a photomask is created. A photomask, or more simply a "mask," provides the master image of one layer of a given integrated chip's physical geometries. A typical photolithography system projects UV light energy on to and through the mask in order to transmit the mask pattern in reduced size to the wafer surface, where it interacts with a photosensitive coating on the wafer.

The resolution limit of conventional optical lithography technology is increasingly being challenged by the sub wavelength, or low-kl, dimensions of the critical IC feature geometries. Not only are the critical dimension feature geometries decreasing in size in accordance with, or even faster than, Moore's Law predictions, the already large number of these feature geometries is growing at a dramatic rate as well. Furthermore, due to the necessity to mitigate optical proximity effect distortions through resolution enhancement techniques at the mask level, the overall polygonal figure count is skyrocketing. These critical feature geometries are patterned far more precisely as well due to the severity and sensitivity of the non-linear imaging. Extreme precision is required for sub wavelength, or low-kl, applications due to highly non-linear imaging behaviors which often magnify mask errors by large factors and non-intuitive manners.

With the overall year-to-year increase in IC logic function, industry trends towards larger and more complex system-on-chip and mixed signal designs, and increasingly aggressive use of artificial layout enhancement for manufacturability (LEM) features such as Resolution Enhancement Technology (RET), Optical Proximity Correction (OPC), and dummy fill patterns, IC physical design layout data volume and resulting mask data file volume sizes are exploding. Using "scatter" or "scattering" bars is an example of such enhancement techniques. A scattering bar is an additional design element, below the resolution of the lithography process, which is placed near another object to enhance the edge quality of that nearby object.

In deep submicron design a significant amount of time and effort is usually spent dealing with design manufacturability rules, such as via rules. A two step process may be employed to handle via rules. First, different via configurations are identified. Second, a large amount of time is spent generating scatter bars around the via.

To illustrate how scattering bars may be generated in conventional tools, consider the via 100 shown in FIG. 1a. The first step to determining a configuration of scattering bars for a via is to perform a "size" operation around the via 100 with the boundary 102 as shown in FIG. 1b. The next step is to perform a spacing operation between the via 100 and the edge of the outer boundary 102 with spacing elements 104a-d as shown in FIG. 1c. Another sizing operation is then performed within the inner boundary 106 as shown in FIG. 1d.

A logical NOT operation is performed between the shapes in this example to reveal the scattering bars 108a, 108b, 108c, and 108d as shown in FIG. 1e. The final configuration 110 of the scattering bars 108a-c around the via 100 is as shown in FIG. 1f.

The problem with this approach is that there is usually a very large number of vias in a design, potentially on a large number of layers. If each via in the design requires this number of actions to process that via, then an inordinate amount of time may be consumed just to handle this type of processing for scattering bars.

The problem is further exacerbated by additional steps that must be taken to address multiple-via combinations. To explain, consider the via combination 202 having vias 204 and 206 shown in FIG. 2a. Using the above process, this via combination 202 may result in the configuration of scattering bars 200a-e shown in FIG. 2b.

In this example, an extraneous scatter bar 200a would have been generated between the two vias. The EDA tool would eliminate the unneeded scattering bar 200a as shown in FIG. 2c.

The problem is that the system would necessarily need to take additional processing operations to find and eliminate all such extraneous scatter bars in the design. If there is a large number of via combinations in the design(and different configurations of such combinations), then a significant amount of resources would have to be additionally expended to handle this problem, which would negatively affect the performance of the EDA tool.

In addition to the above, part of DRC operations is to check the correctness of scattering bars, e.g., for distance and dimensions. In addition, correctness of scattering bars to neighboring scattering bars must be checked.

Therefore, there is a need for improved techniques to handle design and manufacturability rules and to implement layout enhancement techniques for IC designs. Some embodiments of the invention pertain to an improved approach for processing design objects, such as vias, for an integrated circuit design. In some embodiments, pattern matching is employed to perform DRC/LVS for scattering bars and Vias. In addition, in some embodiments, a library of via combinations is used to insert scattering bars into design. This approach of using a library can be applied to other structures in design in addition to vias.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Some embodiments of the invention are directed to an improved approach for processing design objects, such as vias, for an integrated circuit (IC) design. In some embodiments, pattern matching is employed to perform DRC/LVS for scattering bars and Vias. In addition, in some embodiments, a library of via combinations is used to insert scattering bars into design. This approach of using a library can be applied to other structures in design in addition to vias.

Figure 1A:
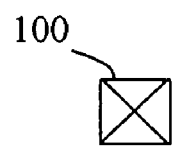
FIGS. 1a-f illustrate an example approach for processing a via for scattering bars.
Figure 1B:
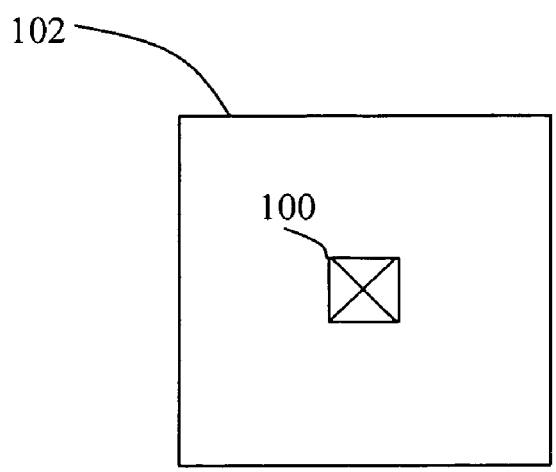
Figure 1C:
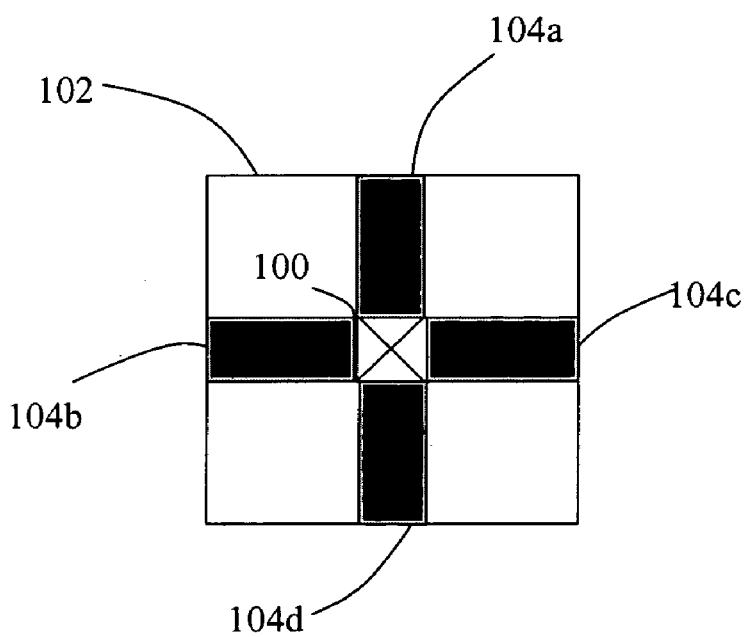
Figure 1D:
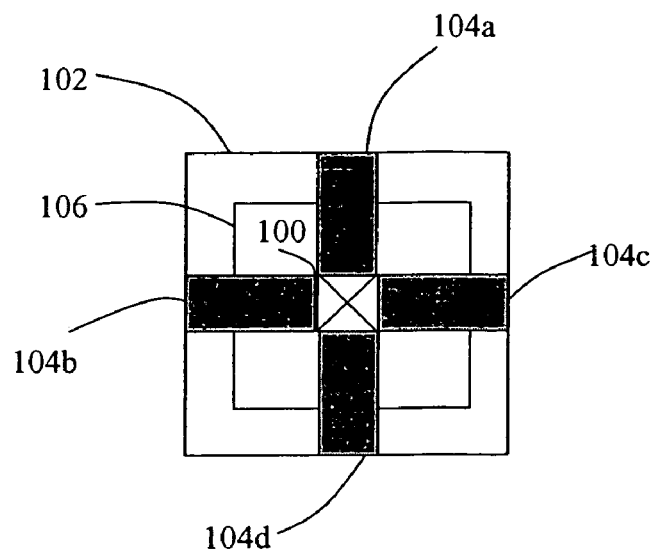
Figure 1E:
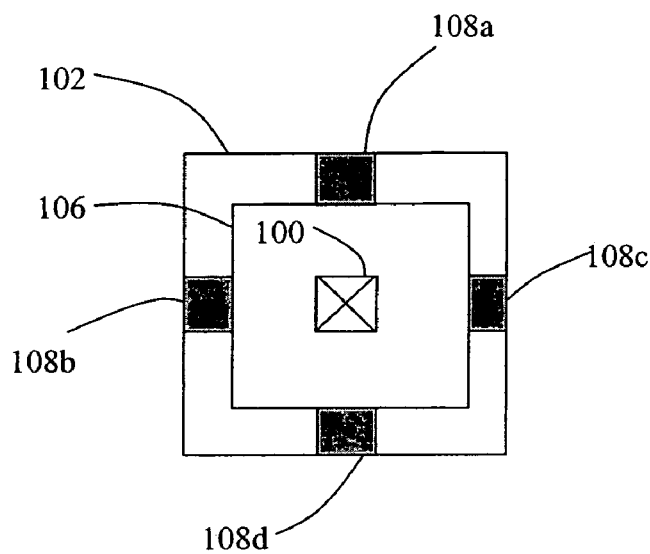
Figure 1F:
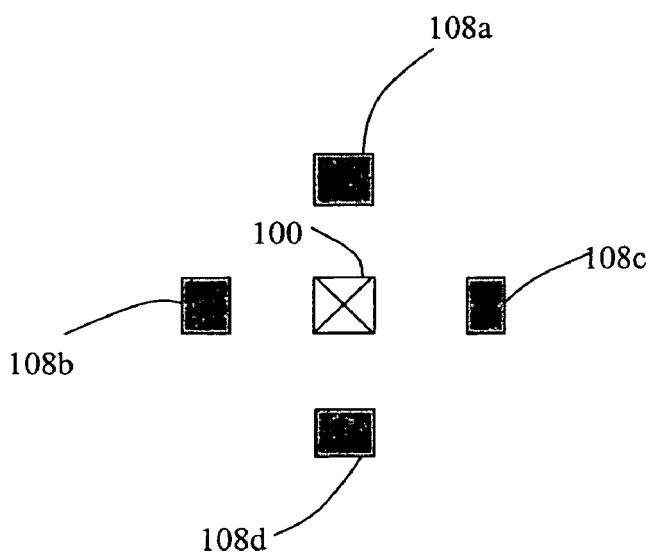
Figure 2A:
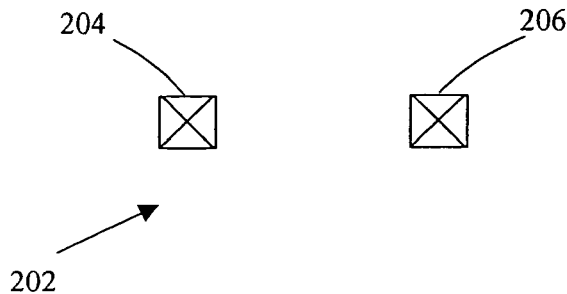
FIGS. 2a-c illustrate an example approach for processing a double via combination for scattering bars.
Figure 2B:
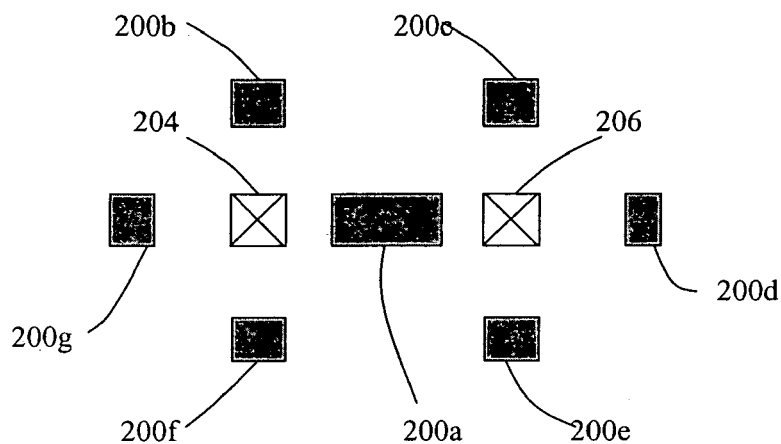
Figure 2C:
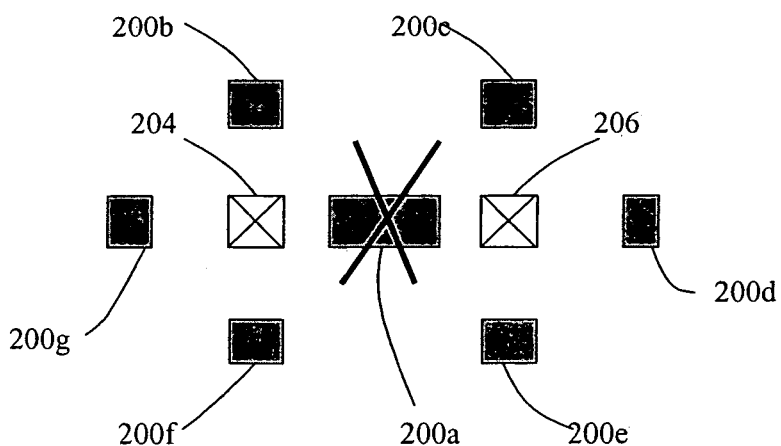
Figure 3A:
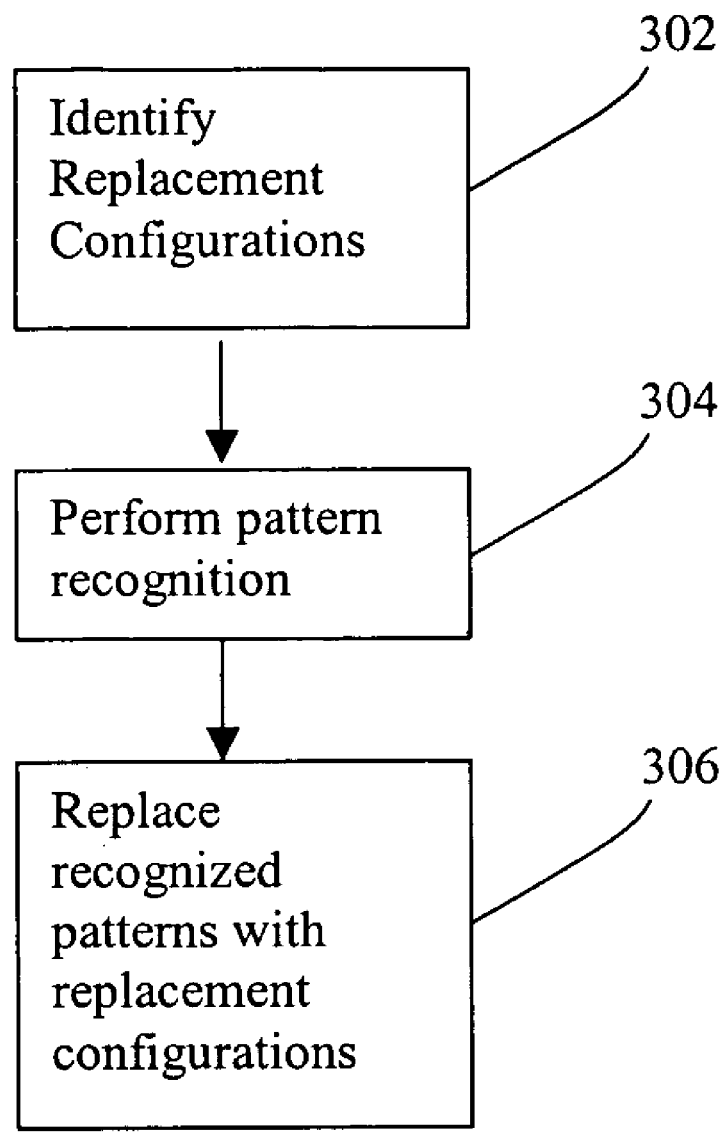
FIG. 3a shows a flowchart of a process for pattern matching to process an IC design.

The solution of some embodiments of the present invention is to employ pattern recognition to substitute recognized patterns of objects with replacement configurations. Referring to FIG. 3a, the process begins with the creation of a set of replacement configurations (302). The replacement configurations may be for any type of object or polygon having any type of enhancement technique application. For example, the original object may be a polygon in the layout having an edge that requires enhancement and the replacement configuration may be that same object with a scattering bar placed along the edge requiring enhancement. The replacement configurations may be a pre-configured library of replacement configurations. In some embodiment, the library of replacement configurations is not fixed in size but may be expanded during the design and verification process to include new replacement configurations as they are identified and developed.

The next action is to perform pattern recognition of the IC layout to identify patterns that correspond to the set of replacement configurations (304). Any suitable pattern recognition approach may be employed within the scope of the invention.

One, some, or all of the identified patterns are then replaced with corresponding replacement configurations (306). A DRC rule check may be performed to check whether a particular replacement configuration complies with designated design rules. In one embodiment, there may be multiple substitute combinations that are checked before a particular substitute combination is identified that complies with designated design rules.

Figure 3B:
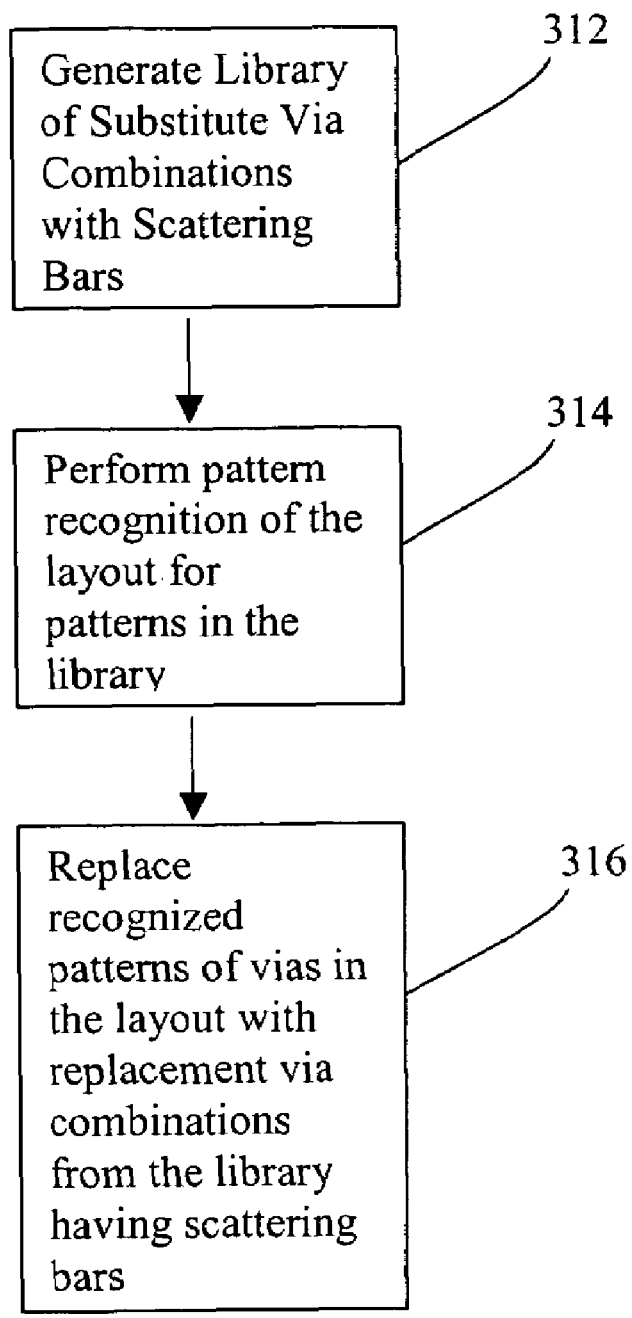
FIG. 3b shows a flowchart of a process for pattern matching to process vias in an IC design.

The above process can be applied in some embodiments to employ pattern recognition to substitute recognized patterns of vias with pre-configured via configurations from library of via configurations. The flowchart of FIG. 3b shows a process for performing the process on vias according to some embodiments of the invention.

The process involves generating a library of substitute via combinations with scattering bars (312). Any number of combinations may be created, acquired, downloaded or purchased for the library. Multiple replacement patterns may exist for a given via combination, to ensure that there is a substitute combination that will comply with design rules in a particular layout.

Pattern recognition is performed upon the layout to identify via candidates for substitution from the library (314). As noted above, any suitable pattern recognition approach may be employed within the scope of the invention. An example of a suitable approach for pattern matching is disclosed in Russian Federation Patent Application Ser. No. 2006120375, filed on Jun. 9, 2006, entitled "МЕТОД И МЕХАНИзМ ЭКСТРАКЦИИ И РАСПОзНАВАНИЯ МНОГОГ ОЛЬНИКОВ ПРИ ПРОЕКТИРНОВАНИИ ИНТЕГ РАЛЬНЫХ СХЕМ" ("METHOD AND MECHANISM FOR EXTRACTION AND RECOGNITION OF POLYGONS IN AN IC DESIGN"), which is hereby incorporated by reference in its entirety.

One, some, or all of the recognized via patterns may be replaced with substitute via combination(s) from the library (316). As with other objects in the design, DRC rule check may be performed to check whether a particular replacement combination complies with designated design rules. In one embodiment, there may be multiple substitute combinations that are checked before a particular substitute combination is identified that complies with designated design rules.

In some embodiments of this process, the user has control over how scattering bars are to be placed for specific via configurations. The new configuration of scattering bars only need to be created once per configuration and placed in a library. This allows the user to have great control over the configurability and customizability of the scattering bars for different via arrangements.

Instead of having to generate scattering bars "on the fly" for the layout, the system performs pattern matching to determine whether there are any recognized patterns of vias that correspond to via configurations in the library.

For the recognized patterns, the system imports the scattering bar configurations from the library and inserts them into the design. This can save a large amount of processing time and resources in the system, since the system does not need to go to each individual via and undergo the extensive sequence of operations to generate scattering bars for each individual via.

Figure 4A:
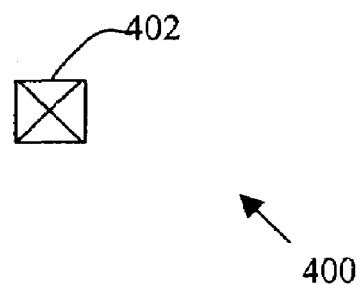
FIGS. 4a-c illustrates example via combinations.
Figure 4B:
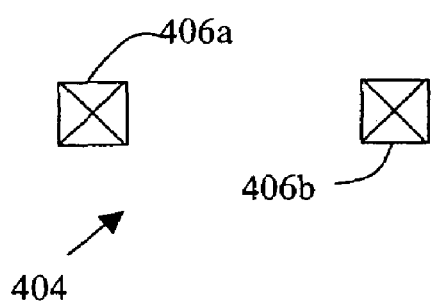
Figure 4C:
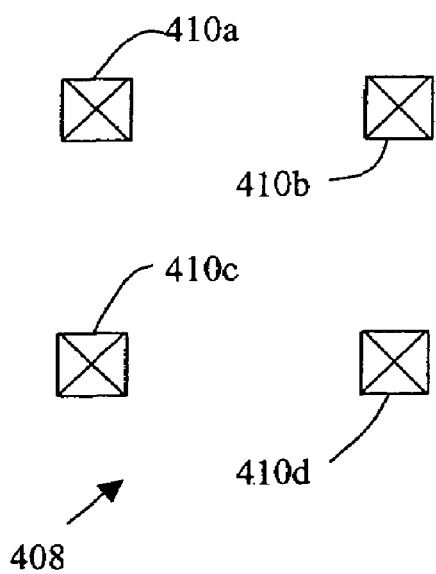

To illustrate this process, consider the example via combinations shown in FIGS. 4a-c. FIG. 4a shows an example of a single via configuration 400 with a single via 402. FIG. 4b shows an example of a double via configuration 404 with two vias 406a and 406b. FIG. 4c shows a via configuration 408 having an array of four vias 410a, 410b, 410c, and 410d.

Figure 5:
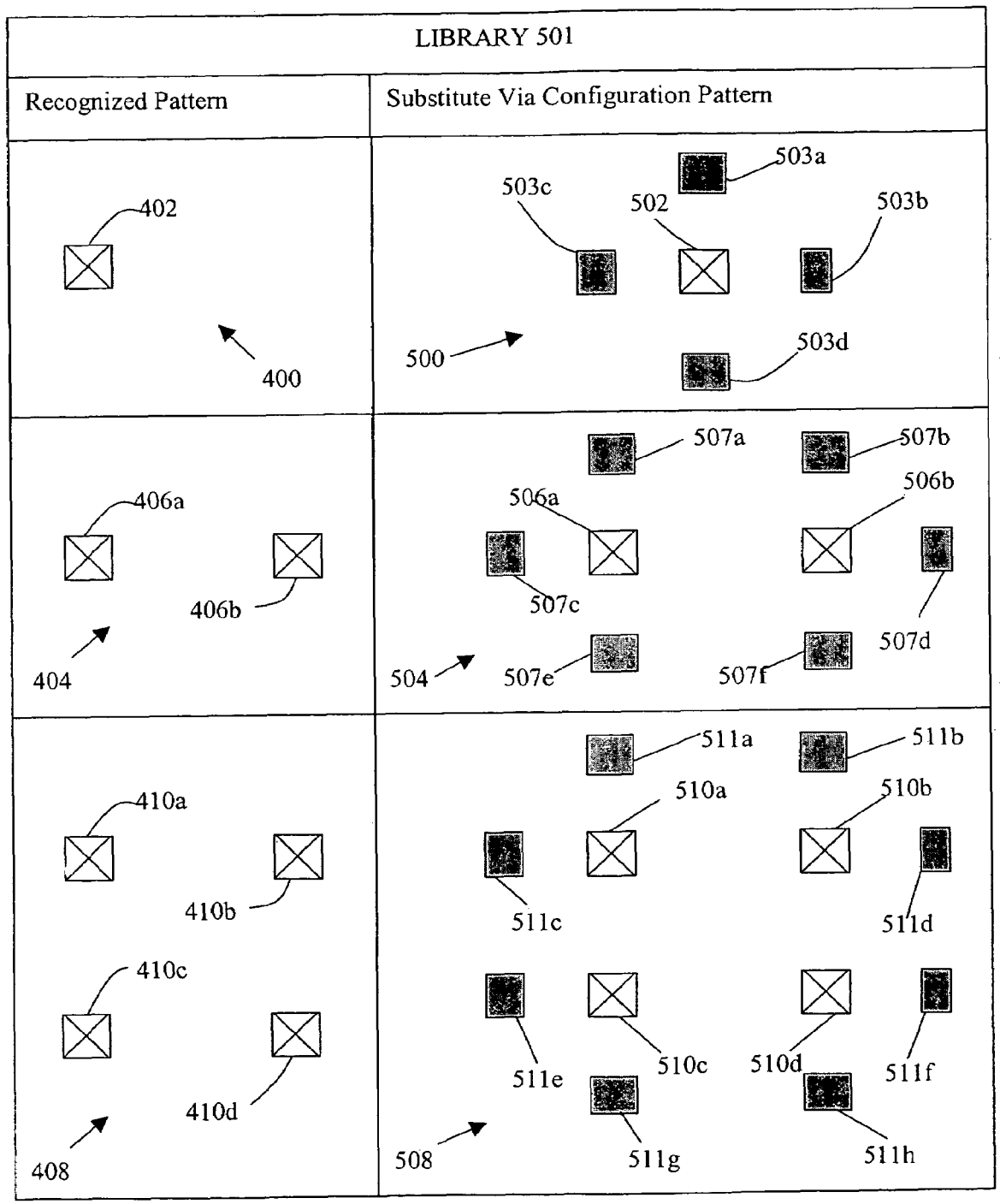
FIG. 5 shows an example library of replacement via configurations.

Some embodiments of the invention would involve creation of a library of substitute via combinations having scatter bars for each of these example via configurations. FIG. 5 shows a library 501 of example substitute via combinations corresponding to the via combinations of FIGS. 4a-c.

For via combination 400 with a single via 402, the library 501 includes a substitute via combination 500 having a via 502 with scattering bars 503a-d along each edge of via 502.

For double via configuration 404 with two vias 406a and 406b, the library 501 includes a substitute combination 504 having vias 506a and 506b with scattering bars 506a-f along edges of the two vias 506a and 506b. It is noted that the substitute via combination 504 does not include an unnecessary scattering bar directly between the two vias 506a and 506b. This highlights one of the advantages of this approach, in that correct replacement patterns can be established once in an upfront manner, and then preserved for use with multiple individual via combinations that match that pattern.

For the via configuration 408 having an array of four vias 410a, 410b, 410c, and 410d, the library 501 includes a substitute combination 508 having vias 510a-d with scattering bars 511a-h along edges of the vias 510a-d. This example replacement combination also does not include scattering bars directly between the vias 510a-d.

Figure 6A:
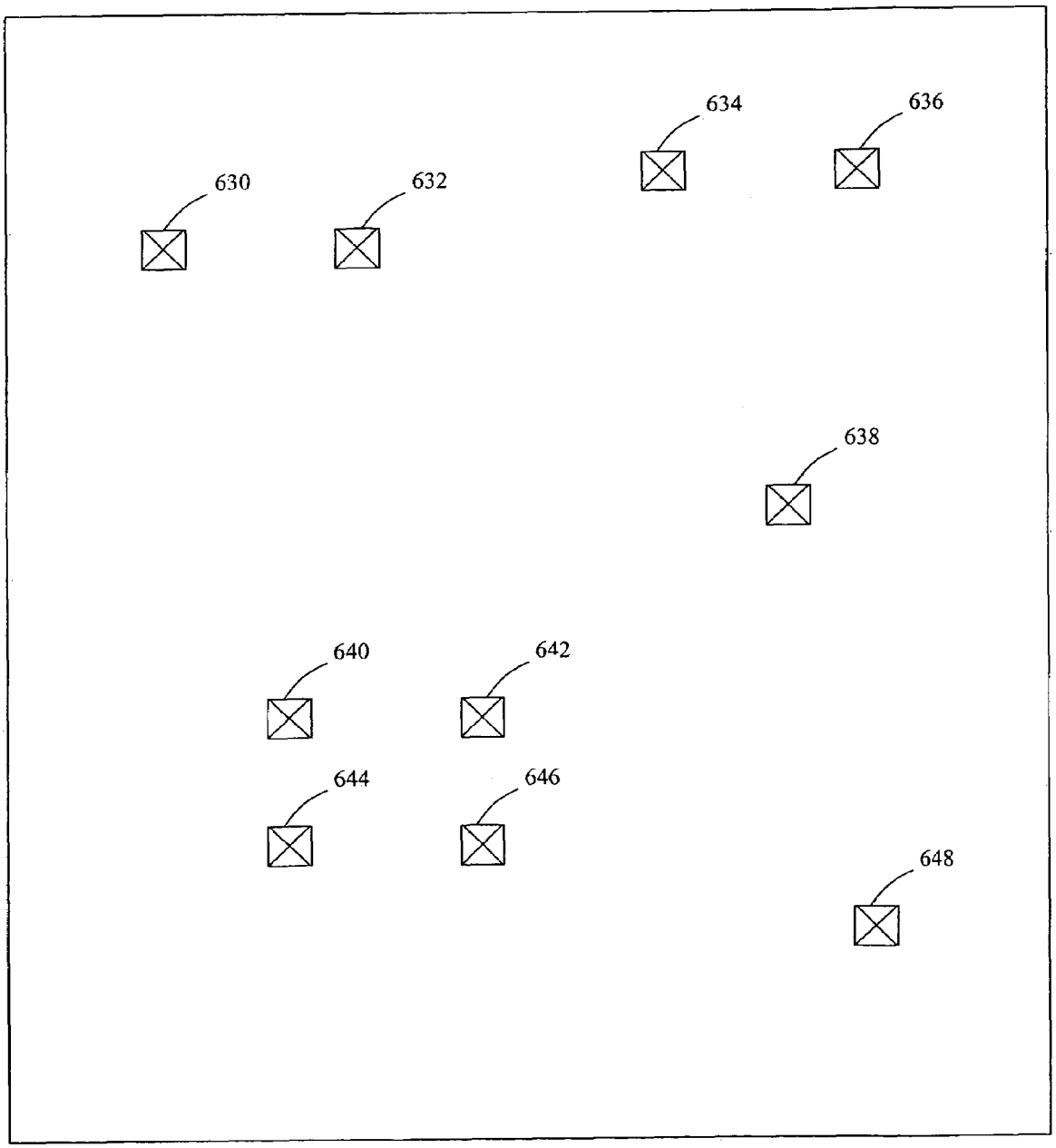
FIG. 6a-d illustrate pattern matching to process vias in an IC design.

Consider the example layout portion shown in FIG. 6a. Numerous vias are shown in this figure, including vias 630, 632, 634, 636, 638, 640, 642, 644, 646, and 648.

One of skill in the art would realize that other layout objects would also typically exist in this type of layout portion, but are not shown here to facilitate illustration and explanation of this embodiment of the invention. It is desired to process the vias such that if necessary or desired, scattering bars are appropriately placed in the layout relative to the vias.

Assume that library 501 of FIG. 5 has already been established. Pattern recognition is performed to determine whether any of the vias in FIG. 6a form one or more combinations that match correspond to the patterns registered in library 501.

Figure 6B:
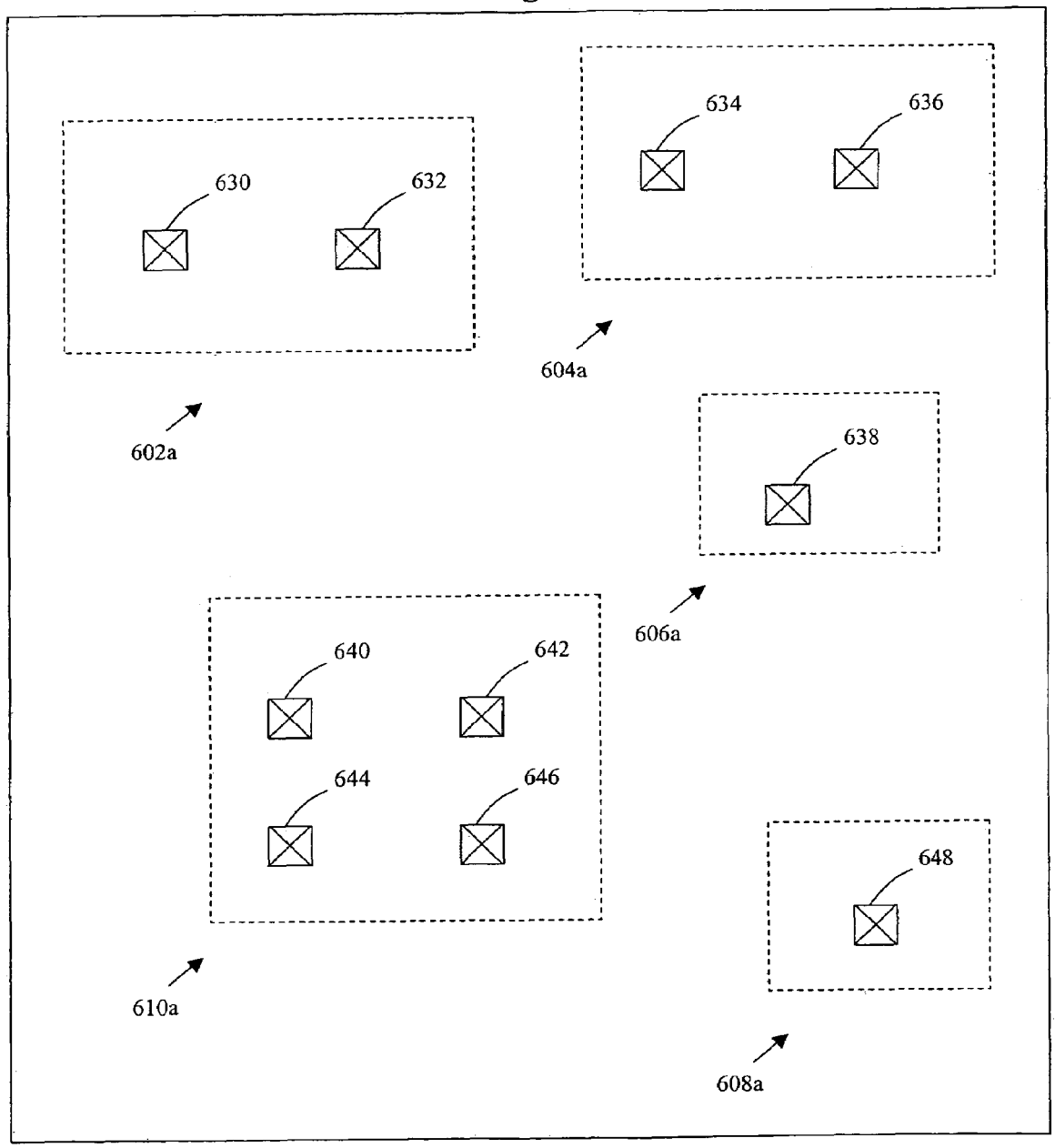

FIG. 6b show various patterns in the example layout portion that correspond to known patterns in the library 501. In particular, pattern 608a in the example layout corresponds to single via combination 400 registered in library 501. Patterns 602a and 604a in the example layout correspond to double via combination 404 registered in library 501. Pattern 610a in the example layout corresponds to the via array combination 408 registered in library 501.

Figure 6C:
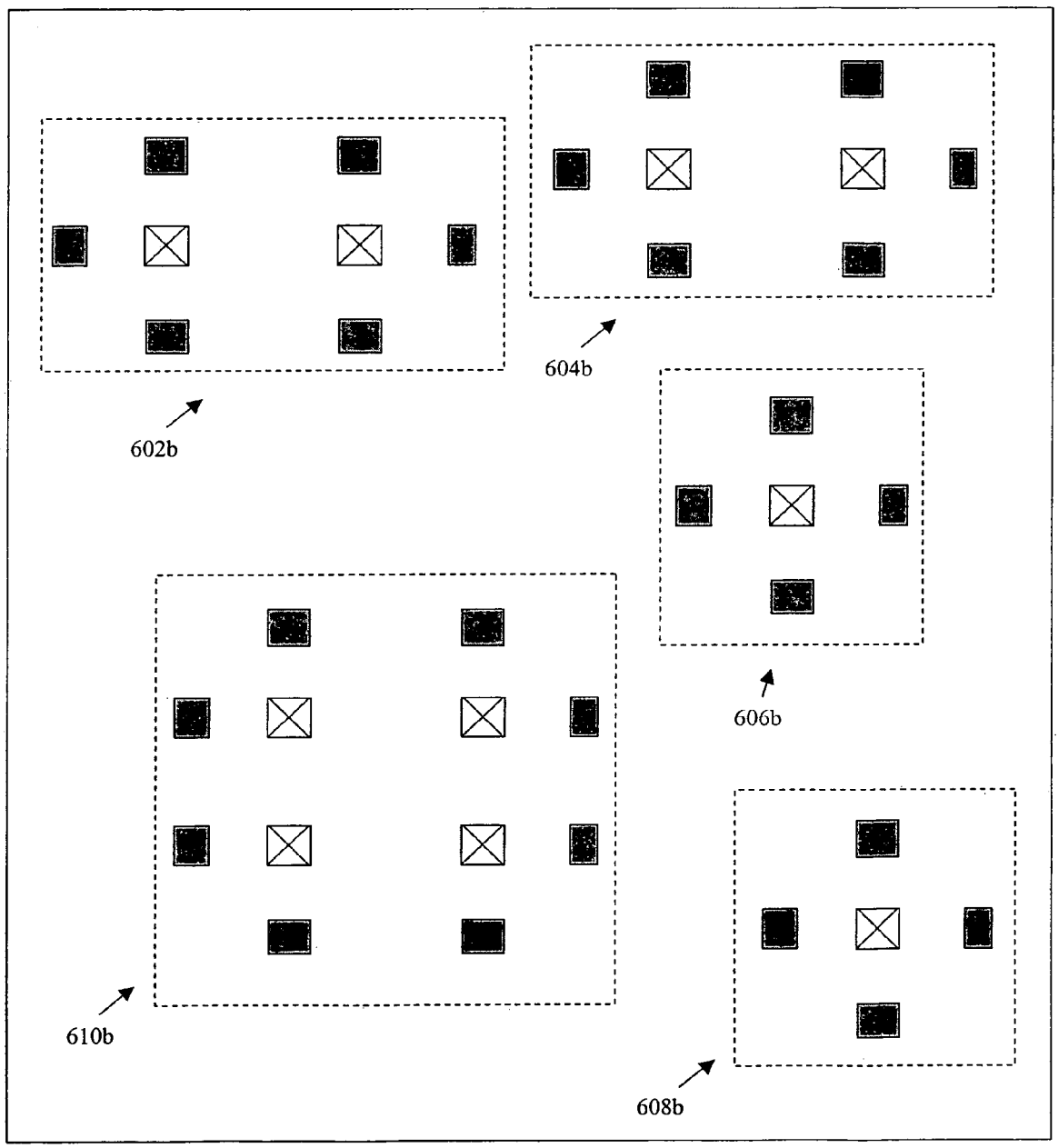

The recognized via patterns can be replaced with a substitute via configuration pattern as shown in FIG. 6c. The recognized single via pattern 608a of FIG. 6b can be replaced with substitute via configuration 500 from library 501, thereby forming a new layout configuration 608b in FIG. 6c.

Figure 6D:
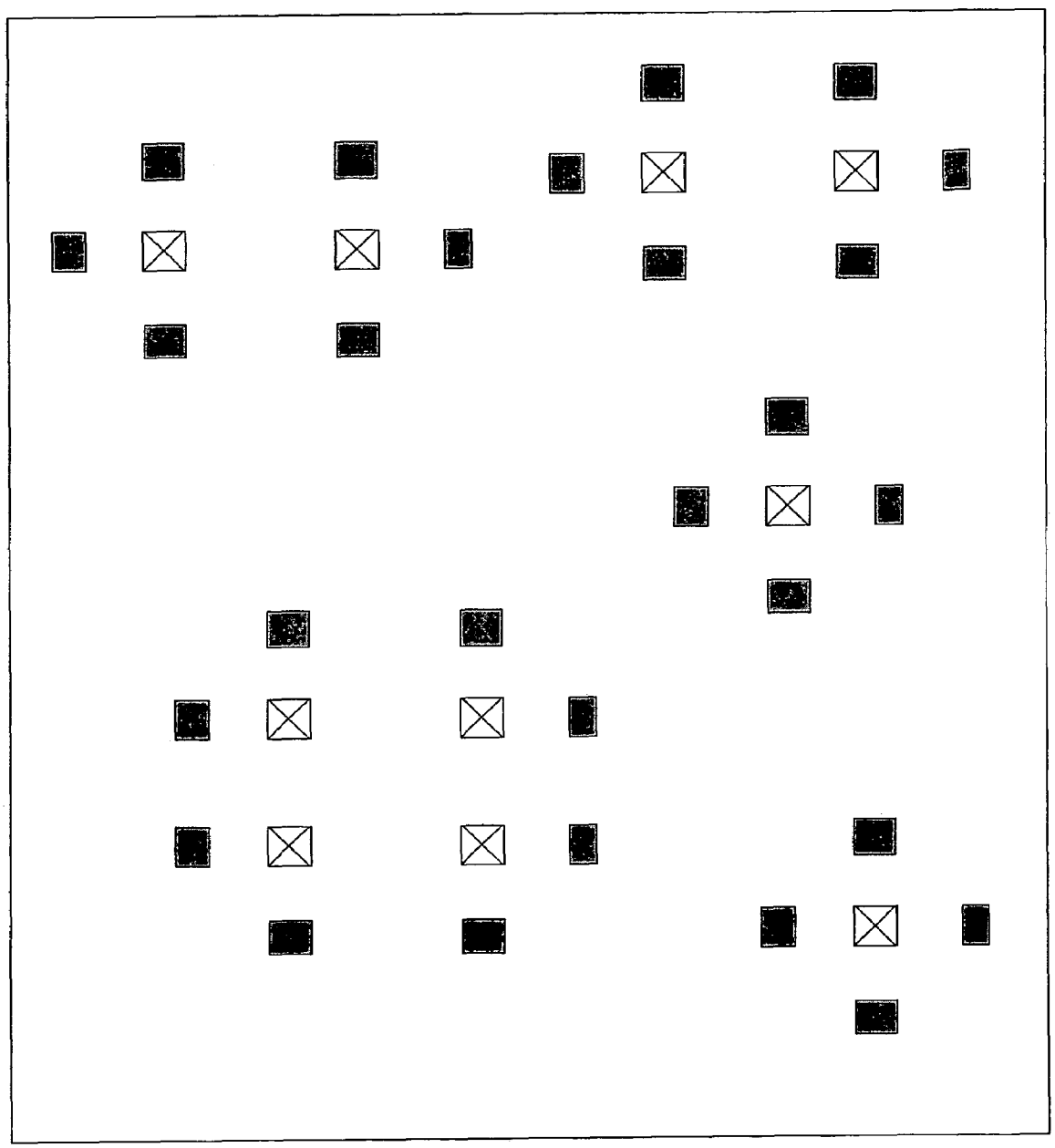

The recognized double via patterns 602a and 602b of FIG. 6b can each be replaced with substitute via configuration 504 from library 501, thereby forming new layout configuration 602b and 604b in FIG. 6c. Similarly, the recognized via array pattern 610a of FIG. 6b can be replaced with substitute via configuration 508 from library 501, thereby forming a new layout configuration 610b in FIG. 6c. The final version of the layout portion is shown in FIG. 6d, assuming appropriate DRC verification has been performed.

As previously noted, the present approach can be applied to any object or polygon in the design, and not just via objects.

Figure 7:
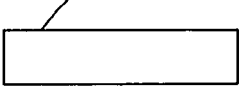
FIG. 7 shows an example library of replacement polygon configurations.
Figure 7:
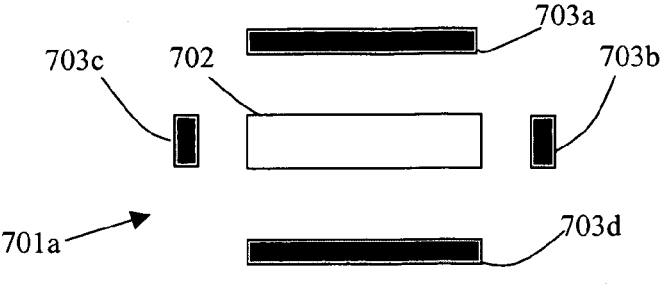
Figure 7:
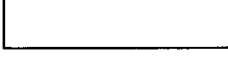
Figure 7:
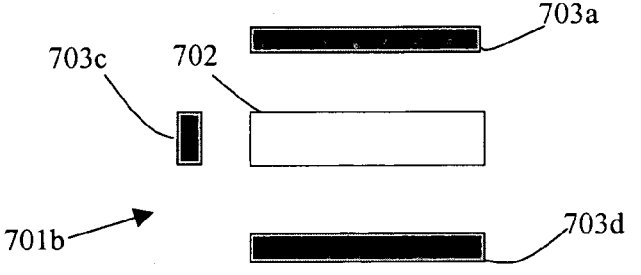
Figure 7:
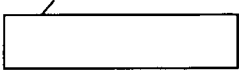
Figure 7:
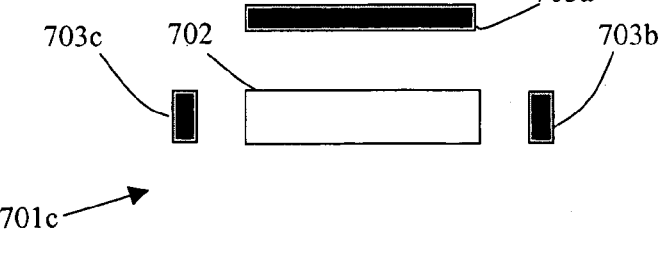
Figure 7:
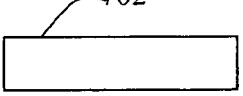
Figure 7:
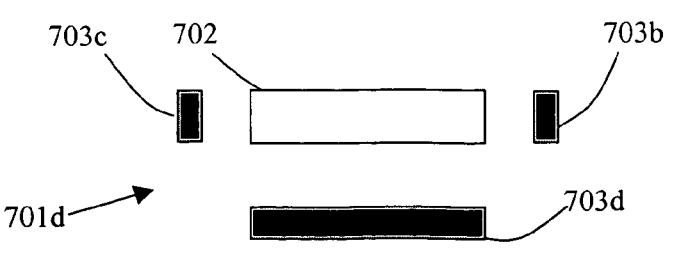

To illustrate, reference is now made to FIG. 7, which shows an example library 707 of replacement configurations for a registered pattern 700. Pattern 700 includes a single polygon 702 having a given width and length.

Library 707 includes multiple possible replacement patterns for registered pattern 700. For example, replacement pattern 701a includes four scattering bars 703a, 703b, 703c, and 703d that has been placed around polygon 700. A second possible replacement pattern 701b includes three scattering bars 703a, 703c, and 703d placed around polygon 700, with the right edge of the polygon 700 not corresponding to a scattering bar. A third possible replacement pattern 701c includes three scattering bars 703a, 703b, and 703c placed around polygon 700, with the bottom edge of the polygon 700 not corresponding to a scattering bar. A fourth possible replacement pattern 701d includes three scattering bars 703b, 703c, and 703d placed around polygon 700, with the top edge of the polygon 700 not corresponding to a scattering bar.

In operation, pattern recognition is performed to the IC layout to check for the presence of registered pattern 700 having the configuration of polygon 702. The pattern 700 in the IC layout may be replaced with one of the replacement patterns 701a-d of library 707 in FIG. 7. Any suitable criteria may be employed to determine the appropriate replacement pattern from multiple possible replacement patterns stored in the library 707. For example, the possible replacement patterns may be checked one-by-one in order from library 707 until the first possible replacement pattern that is DRC correct is identified, which is then used as the replacement pattern. Alternatively, heuristics may be employed to identify the optimal or most appropriate replacement pattern to use if multiple replacement patterns are DRC correct, e.g., by using a DRC correct replacement pattern that performs OPC correction upon the most number of edges.

While only certain example object, polygon, and via configurations were illustratively shown in this document, those skilled in the art would realize that the inventive principles described herein are of course applicable to a much broader range of objects, polygon, and vias.

Figure 8:
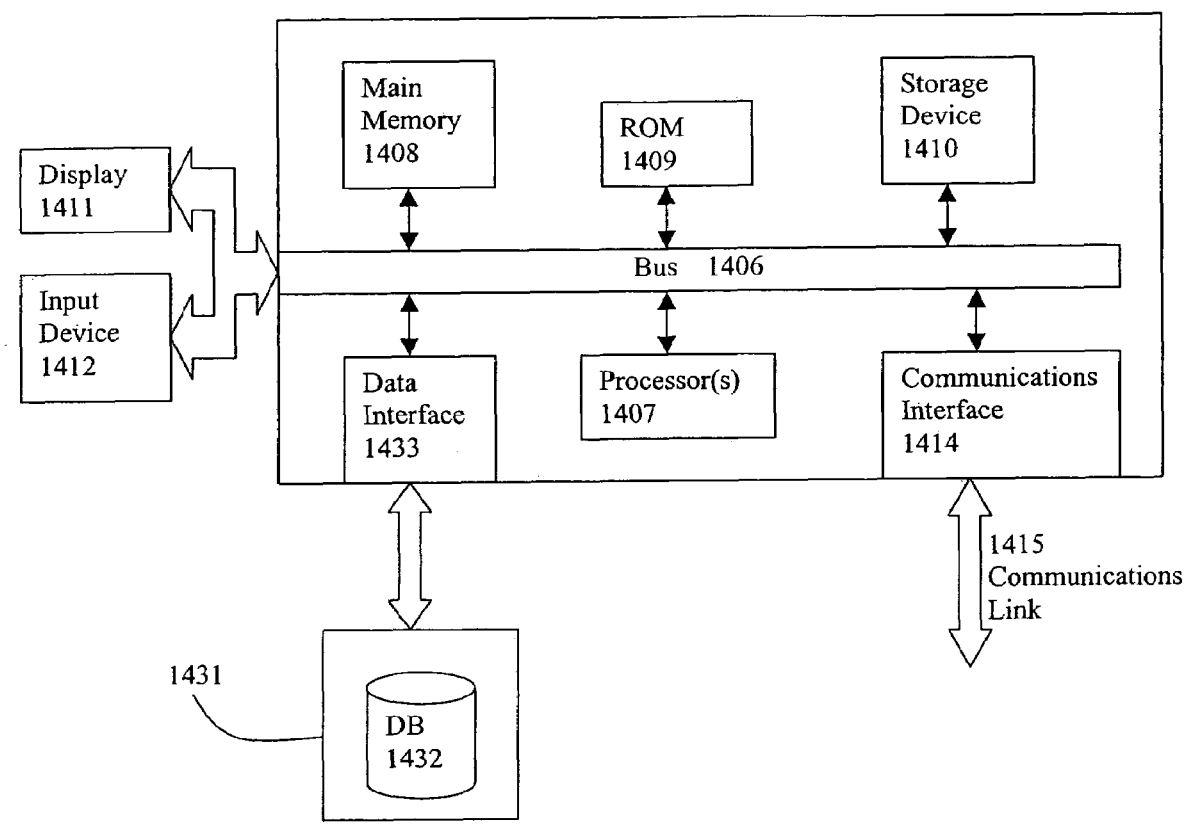
FIG. 8 illustrates an example computing architecture with which embodiments of the invention may be practiced.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer-implemented method for processing objects in an integrated circuit design layout, comprising:
   identifying an integrated circuit design;
   identifying a set of replacement configurations for the integrated circuit design, the set of replacement configurations comprising one or more replacement configurations incorporating object enhancement for manufacturing of one or more layout objects in the integrated circuit design;
   recognizing a pattern in the integrated circuit design corresponding to a replacement configuration within the set of replacement configurations;
   performing design rule checking to check whether the replacement configuration complies with design rules;
   replacing the pattern with the replacement configuration; and
   storing in a computer readable medium the replacement configuration in the integrated circuit design or displaying the replacement configuration on a display device, wherein the set of replacement configurations is a library of pre-configured replacement configurations, wherein the object enhancement comprises a scattering bar and wherein the one or more layout objects comprise via objects.

2. The method of claim 1 in which the pattern corresponds to a plurality of replacement configurations.

3. The method of claim 2 in which the pattern is replaced with a selected one of the plurality of replacement configurations.

4. The method of claim 1 in which design rule checking is performed to check whether the corresponding replacement configuration is appropriate for the integrated circuit design.

5. A computer-implemented method for processing via objects in an integrated circuit design layout, comprising:
   identifying an integrated circuit design having one or more via objects;
   identifying a set of replacement via configurations for the integrated circuit design having object enhancement for manufacturability;
   recognizing a via pattern in the integrated circuit design corresponding to a replacement via configuration within the set of via replacement configurations;
   performing design rule checking to check whether the replacement via configuration complies with design rules;
   replacing the via pattern with the via replacement configuration; and
   storing in a computer readable medium the via replacement configuration in the integrated circuit design or displaying the replacement configuration on a display device, wherein the set of via replacement configurations is a library of pre-configured via replacement configurations and wherein the object enhancement comprises a scattering bar.

6. The method of claim 5 in which the via pattern corresponds to a plurality of via replacement configurations.

7. The method of claim 6 in which the pattern is replaced with a selected one of the plurality of replacement configurations.

8. The method of claim 5 in which design rule checking is performed to check whether the corresponding via replacement configuration is appropriate for the integrated circuit design.

9. A system having a processor for processing objects in an integrated circuit design layout, comprising:
   means for identifying an integrated circuit design; means for identifying a set of replacement configurations for the integrated circuit design, the set of replacement configurations comprising one or more replacement configurations incorporating object enhancement for manufacturing of one or more layout objects in the integrated circuit design;
   means for recognizing a pattern in the integrated circuit design corresponding to a replacement configuration within the set of replacement configurations;
   means for performing design rule checking to check whether the replacement configuration complies with design rules; and
   means for replacing the pattern with the replacement configuration, wherein the set of replacement configurations is a library of pre-configured replacement configurations, wherein the object enhancement comprises a scattering bar and wherein the one or more layout objects comprise via objects.

10. The system of claim 9 in which the pattern corresponds to a plurality of replacement configurations.

11. A computer program product comprising a tangible computer usable medium having executable code to execute a process for processing objects in an integrated circuit design layout, the process comprising:
   identifying an integrated circuit design;
   identifying a set of replacement configurations for the integrated circuit design, the set of replacement configurations comprising one or more replacement configurations incorporating object enhancement for manufacturing of one or more layout objects in the integrated circuit design;

recognizing a pattern in the integrated circuit design corresponding to a replacement configuration within the set of replacement configurations;

performing design rule checking to check whether the replacement configuration complies with design rules; and replacing the pattern with the replacement configuration, wherein the set of replacement configurations is a library of pre-configured replacement configurations, wherein the object enhancement comprises a scattering bar and wherein the one or more layout objects comprise via objects.

12. The product of claim 11 in which the pattern corresponds to a plurality of replacement configurations.

13. A system having a processor for processing via objects in an integrated circuit design layout, comprising: means for identifying an integrated circuit design having one or more via objects;

means for identifying a set of replacement via configurations for the integrated circuit design having object enhancement for manufacturability;

means for recognizing a via pattern in the integrated circuit design corresponding to a replacement via configuration within the set of via replacement configurations;

performing design rule checking to check whether the replacement via configuration complies with design rules; and means for replacing the via pattern with the via replacement configuration, wherein the set of replacement via configurations is a library of pre-configured via replacement configurations and wherein the object enhancement comprises a scattering bar.

14. The system of claim 13 in which the via pattern corresponds to a plurality of via replacement configurations.

15. A computer program product comprising a tangible computer usable medium having executable code to execute a process for processing via objects in an integrated circuit design layout, the process comprising:

identifying an integrated circuit design having one or more via objects; identifying a set of replacement via configurations for the integrated circuit design having object enhancement for manufacturability;

recognizing a via pattern in the integrated circuit design corresponding to a replacement via configuration within the set of via replacement configurations;

performing design rule checking to check whether the replacement via configuration complies with design rules; and replacing the via pattern with the via replacement configuration, wherein the set of replacement via configurations is a library of pre-configured via replacement configurations and wherein the object enhancement comprises a scattering bar.

16. The product of claim 14 in which the via pattern corresponds to a plurality of via replacement configurations.

* * * * *